United States Patent
Onishi et al.

(10) Patent No.: US 11,381,001 B2
(45) Date of Patent: Jul. 5, 2022

(54) REFLECTOR, DEPLOYABLE ANTENNA, AND SPACECRAFT

(71) Applicant: Institute for Q-shu Pioneers of Space, Inc., Fukuoka (JP)

(72) Inventors: Shunsuke Onishi, Fukuoka (JP); Tetsuo Yasaka, Fukuoka (JP); Kazuo Kuno, Fukuoka (JP); Yohei Koga, Fukuoka (JP)

(73) Assignee: Institute for Q-shu Pioneers of Space, Inc., Fukuoka (JP)

( * ) Notice: Subject to any disclaimer, the term of this patent is extended or adjusted under 35 U.S.C. 154(b) by 177 days.

(21) Appl. No.: 16/760,015

(22) PCT Filed: Oct. 30, 2017

(86) PCT No.: PCT/JP2017/039088
§ 371 (c)(1),
(2) Date: Apr. 28, 2020

(87) PCT Pub. No.: WO2019/087236
PCT Pub. Date: May 9, 2019

(65) Prior Publication Data
US 2021/0167516 A1 Jun. 3, 2021

(51) Int. Cl.
*H01Q 15/16* (2006.01)
*H01Q 1/28* (2006.01)
*H01Q 15/20* (2006.01)

(52) U.S. Cl.
CPC .......... *H01Q 15/161* (2013.01); *H01Q 1/288* (2013.01); *H01Q 15/20* (2013.01)

(58) Field of Classification Search
CPC ....... H01Q 1/288; H01Q 15/161; H01Q 15/20
See application file for complete search history.

(56) References Cited

U.S. PATENT DOCUMENTS

| 3,217,328 A | 11/1965 | Miller |
| 3,541,569 A | 11/1970 | Berks et al. |
| (Continued) | | |

FOREIGN PATENT DOCUMENTS

| FR | 2836451 | 8/2003 | |
| FR | 2836451 A1 * | 8/2003 | ............. B64G 1/222 |
| (Continued) | | | |

OTHER PUBLICATIONS

Extended European Search Report for EP 17930491.0-1205 / 3706245 PCT/JP2017039088, dated May 21, 2021, 11 pages.

(Continued)

*Primary Examiner* — Andrea Lindgren Baltzell
*Assistant Examiner* — Amal Patel
(74) *Attorney, Agent, or Firm* — Klarquist Sparkman, LLP

(57) ABSTRACT

Deployable reflectors and antennas and spacecraft using such reflectors are disclosed. An example disclosed reflector includes: a hub having a cross-section formed in a circular, elliptical or polygonal shape; a plurality of ribs, each rib having an inner side surface facing an outer peripheral side of the hub when folded, and an outer side surface that is a surface opposite to the inner side surface, the plurality of ribs being folded to be wound around an outer periphery of the hub such that the inner side surface of each rib and the outer side surface of its adjacent rib partially face each other or the outer side surface of each rib and the inner side surface of its adjacent rib partially face each other, each rib being deployed in a parabolic shape; and a sheet installed across each of the plurality of ribs and capable of reflecting radio waves.

12 Claims, 10 Drawing Sheets

(56) References Cited

U.S. PATENT DOCUMENTS

| | | |
|---|---|---|
| 3,848,821 A | 11/1974 | Scheel |
| 4,030,103 A | 6/1977 | Campbell |
| 4,568,945 A | 2/1986 | Winegard et al. |
| 5,446,474 A | 8/1995 | Wade et al. |
| 5,969,695 A * | 10/1999 | Bassily .................... H01Q 1/08 343/912 |
| 6,195,067 B1 | 2/2001 | Gilger |
| 8,356,774 B1 | 1/2013 | Banik et al. |
| 2019/0359354 A1* | 11/2019 | Ogi ........................ H01Q 1/288 |

FOREIGN PATENT DOCUMENTS

| | | |
|---|---|---|
| JP | 02-99497 | 4/1990 |
| JP | H 02-112304 A | 4/1990 |
| JP | 2000-244236 | 9/2000 |
| JP | 2005-086698 | 3/2005 |
| JP | 2008-221876 | 9/2008 |
| JP | 2016-80710 | 5/2016 |

OTHER PUBLICATIONS

Chinese Office Action for CN 201780096349.1 (with English translation), dated May 18, 2021, 17 pages.

International Search Report and Written Opinion issued in corresponding PCT Application No. PCT/JP2017/039088, dated Jan. 16, 2018, 8pp.

* cited by examiner

REFLECTOR, DEPLOYABLE ANTENNA, AND SPACECRAFT

CROSS-REFERENCE TO RELATED APPLICATIONS

This is the U.S. National Stage of International Application No. PCT/JP2017/039088, filed Oct. 30, 2017, which was published in English under PCT Article 21(2). The disclosure of International Application No. PCT/JP2017/039088 is incorporated herein by reference in its entirety.

TECHNICAL FIELD

The present disclosure relates to a reflector, and a deployable antenna and spacecraft using the reflector.

BACKGROUND ART

Conventionally, reflectors for deployable antennas mounted on spacecraft such as artificial satellites are compactly stored during transportation or not in use and deployed when in use to be used for communication, as typified by reflectors for portable antennas and satellite mounted antennas. For example, Patent Literature 1 describes that in a deployable antenna which supports a cable network functioning as an antenna reflection surface with a deployable truss, the deployable truss can be stored and deployed using a sliding hinge.

CITATION LIST

Patent Document

Patent Literature 1: JP 2005-086698 A

SUMMARY OF INVENTION

Technical Problem

Based on the above-described technology, the present disclosure provides, in various embodiments, a reflector that can be deployed by a simpler method, and a deployable antenna and spacecraft using the reflector.

Solution to Problem

According to one aspect of the present disclosure, provided is "a reflector, comprising: a hub having a cross section formed in a circular, elliptical or polygonal shape; a plurality of ribs, each of which has an inner side surface facing an outer peripheral side of the hub when folded, and an outer side surface that is a surface opposite to the inner side surface, the plurality of ribs being folded so as to be wound around an outer periphery of the hub such that the inner side surface of each rib and the outer side surface of its adjacent rib partially touch each other or the outer side surface of each rib and the inner side surface of its adjacent rib partially touch each other, each rib being deployed in a parabolic shape from a bottom end connected to the hub toward a tip end located opposite to the bottom end; and a sheet installed across each of the plurality of ribs and capable of reflecting radio waves".

According to one aspect of the present disclosure, provided is "a deployable antenna comprising: a reflector; and a radiator that emits radio waves to the sheet of the reflector".

According to one aspect of the present disclosure, provided is "spacecraft, comprising: a reflector; a radiator that emits radio waves to the sheet of the reflector; a control device that generates information for transmission by the radio waves; and a power supply device that supplies electric power required to drive the radiator and the control device".

Advantageous Effects of Invention

According to various embodiments of the present disclosure, it is possible to provide a reflector that can be deployed by a simpler method, and a deployable antenna and spacecraft using the reflector.

Additionally, the above effects are merely exemplary for convenience of description, and are not intended to limit the present disclosure. In addition to or in place of the above-described effects, any of the effects described in the present disclosure and effects obvious to those skilled in the art can be obtained.

DESCRIPTION OF EMBODIMENTS

Figure 1:
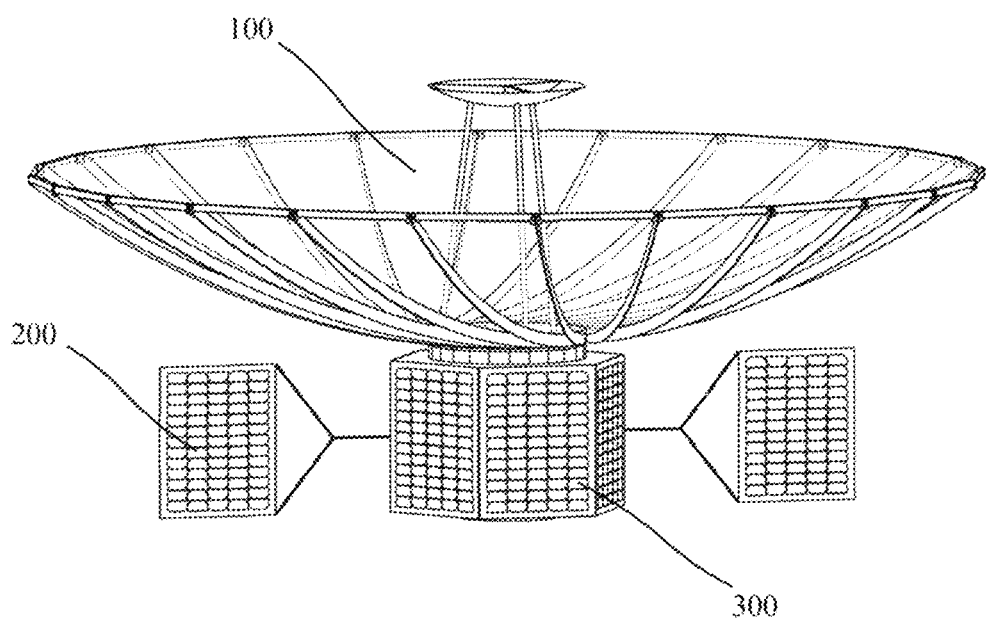
FIG. 1 is a diagram showing the structure of spacecraft 1 according to a first embodiment of the present disclosure.

Various embodiments of the present disclosure will be described with reference to the accompanying drawings. Additionally, common elements in the drawings are denoted by the same reference signs.

First Embodiment

1. Structure of Spacecraft 1

FIG. 1 is a diagram showing the structure of spacecraft 1 according to a first embodiment of the present disclosure. According to FIG. 1, the spacecraft 1 includes a control unit 300 that controls the navigation of the spacecraft 1 itself and controls the operation and attitude of the spacecraft 1 in space, a power supply unit 200 that supplies electric power to drive various components including the control unit 300 and a radiator 110 in space, and a communication unit 100 for transmitting and receiving information between the spacecraft 1 and the earth or other spacecraft.

Figure 2:
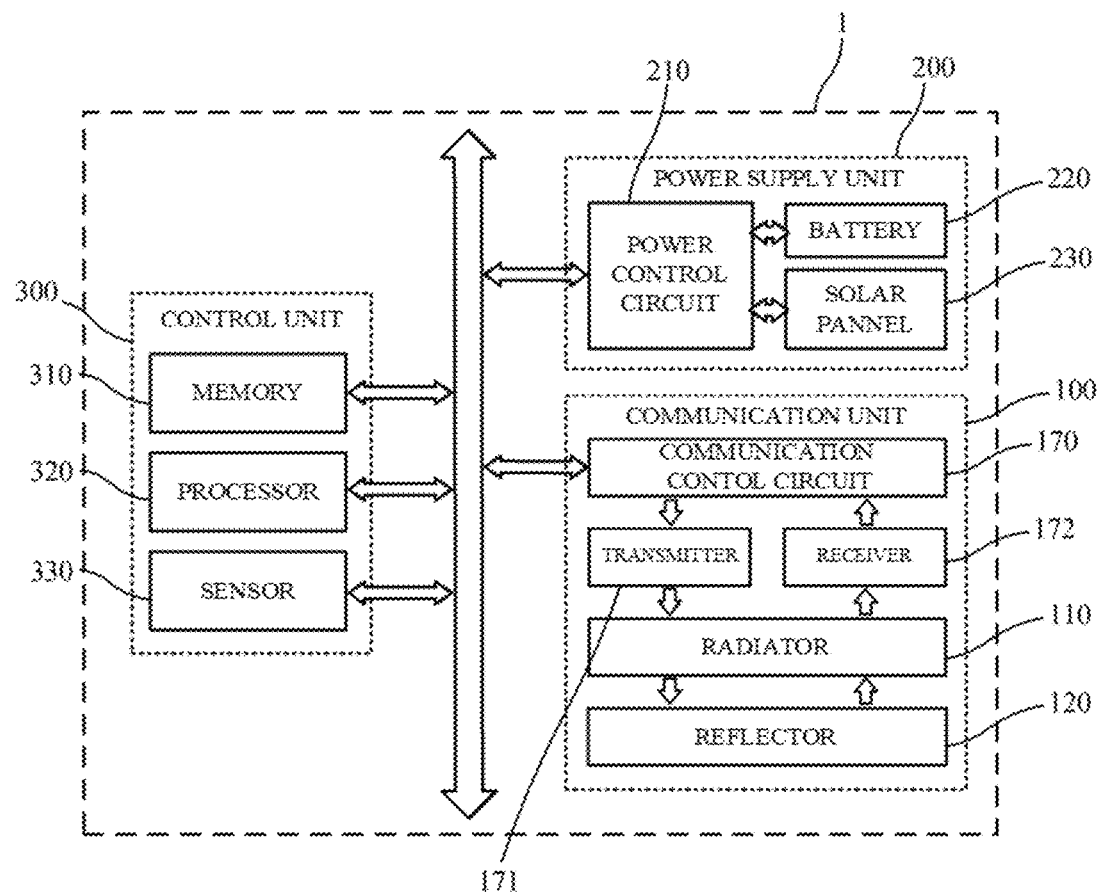
FIG. 2 is a block diagram showing the structure of the spacecraft 1 according to the first embodiment of the present disclosure.

FIG. 2 is a block diagram showing the structure of the spacecraft 1 according to the first embodiment of the present disclosure. The spacecraft 1 does not need to include all of the components shown in FIG. 2, and may have a structure in which some of the components are omitted or other components are added. For example, the spacecraft 1 can include multiple power supply units 200 and/or multiple communication units 100.

According to FIG. 2, the spacecraft 1 includes the control unit 300 including a memory 310, a processor 320, and a sensor 330; the power supply unit 200 including a power control circuit 210, a battery 220, and a solar panel 230; and the communication unit 100 including a communication control circuit 170, a transmitter 171, a receiver 172, the radiator 110, and a reflector 120. These components are electrically connected to one another through a control line and a data line.

The memory 310 includes a RAM, a ROM, a nonvolatile memory, an HDD, and the like to function as a storage portion. The memory 310 stores, as a program, instructions for various types of control of the spacecraft 1 according to the embodiment. Additionally, the memory 310 appropriately stores, for example, the images of the outside of the spacecraft 1 captured by a camera (not shown), detection information on various sensors 330 necessary for controlling the spacecraft 1, and the like.

The processor 320 controls the spacecraft 1 on the basis of the program stored in the memory 310, and generates information to be transmitted to a ground base or other spacecraft through the communication unit 100.

The sensor 330 may include, for example, a gyro sensor, an acceleration sensor, a position sensor, a velocity sensor, and the like necessary for controlling the travelling and attitude of the spacecraft 1; a temperature sensor, an illuminance sensor, an infrared sensor, and the like for observing the external environment of the spacecraft 1; and a temperature sensor, an illuminance sensor, and the like for measuring the internal environment of the spacecraft 1. The detected information and data are appropriately stored in the memory 310 to be used for control by the processor 320 or to be transmitted to the ground base through the communication unit 100.

The power control circuit 210 is connected to the battery 220 and controls charging and discharging of electric power from the battery 220. The battery 220 is charged with the electric power generated by the solar panel 230 under control of the power control circuit 210, and stores the electric power to be supplied to each of drive systems such as the control unit 300.

The communication control circuit 170 performs processing such as modulation and demodulation in order to transmit and receive information to and from a ground base or other spacecraft through the connected radiator 110. The modulated signal is converted into a high-frequency radio frequency and amplified in the transmitter 171, and is emitted to a reflecting surface of the reflector 120 through the radiator 110. In the present embodiment, the high-frequency signal emitted from the radiator 110 is once reflected by a subreflector 122 which is a secondary mirror, and is further radiated to the outside by a reflector 121 which is a primary mirror. On the other hand, the high frequency signal received from the outside is received by the receiver 172 through the reverse path, and is demodulated in the communication control circuit 170. Additionally, the reflector 120 is stored compactly during transportation or not in use, but is deployed when in use. Also, in the present embodiment, the deployable antenna includes at least the radiator 110 and the reflector 120.

2. Structure of Deployable Antenna 10

Figure 3:
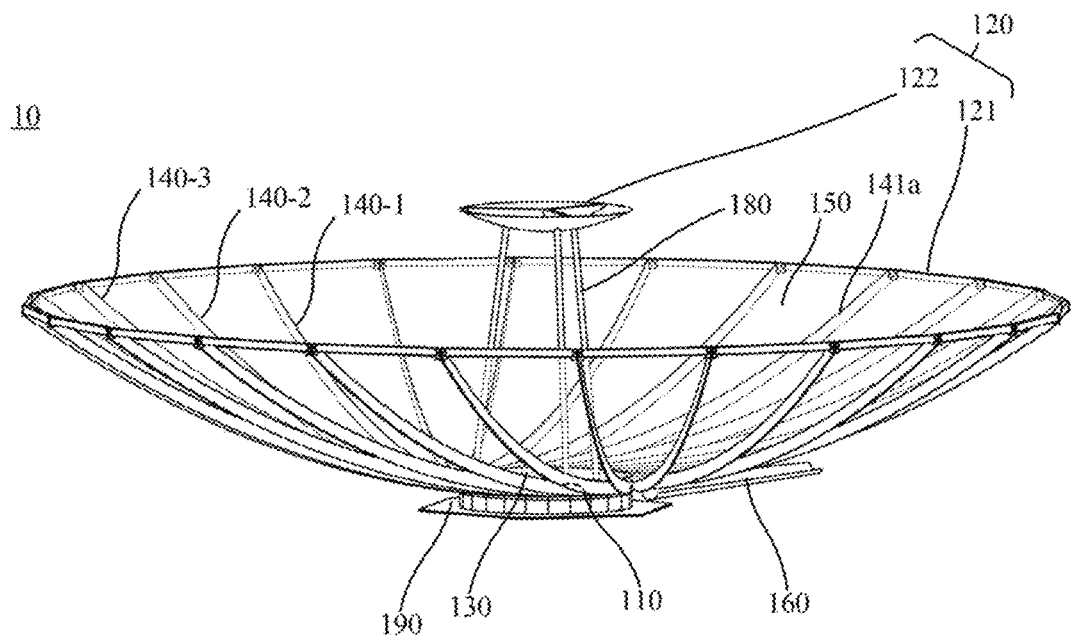
FIG. 3 is a diagram showing the structure of a deployable antenna 10 according to the first embodiment of the present disclosure.

FIG. 3 is a diagram showing the structure of the deployable antenna 10 according to the first embodiment of the present disclosure. According to FIG. 3, in the present embodiment, the deployable antenna 10 mainly includes the radiator 110 and the reflector 120 shown in FIG. 1. Specifically, the deployable antenna 10 includes the radiator 110, the subreflector (secondary mirror) 122 that is disposed so as to face the radiator 110 at a predetermined angle and provided to reflect radio waves emitted from the radiator 110 to the reflector 121 which is a primary reflecting mirror, the reflector 121 that is disposed so as to face the mirror surface of the subreflector 122 and is a primary reflecting mirror that further reflects the radio waves reflected by the subreflector 122 and emits radio waves to the outside, and a support member 180 for supporting the subreflector 122. The deployable antenna 10 is installed on the spacecraft 1 by fixing a hub 130 to a pedestal 190 of the spacecraft 1.

The reflector 121 includes the hub 130, multiple ribs 140, a sheet 150, a case 160, and the like. The reflector 121 has a parabolic reflection surface in order to function as a primary reflecting mirror as described above.

The hub 130 is provided on an antenna axis X (also referred to as central axis X of hub 130) at the center of the deployable antenna 10. For example, the hub 130 is formed in a cylindrical shape from a dielectric material such as plastic or a metal such as titanium or stainless steel. The hub 130 has a rib mounting portion 133 provided on an outer peripheral surface 131a thereof, and multiple ribs 140 are radially arranged at predetermined intervals.

The rib 140 includes multiple ribs 140-1 to 140-n. The ribs 140 are radially arranged on the outer periphery of the hub 130 at predetermined intervals around the hub 130. An upper surface 141a of each rib 140 on the side that is a reflecting mirror surface is formed in a parabolic shape. Then, the sheet 150 is installed across the upper surfaces 141a formed in a parabolic shape. For example, the rib 140 is a spring material formed of stainless spring steel or a composite material such as glass fiber reinforced plastics (GFRPs) and carbon fiber reinforced plastics (CFRPs), and has elasticity.

Additionally, in the present embodiment, the ribs 140 include a total of 24 ribs. However, the number of the ribs 140 can be changed regardless of whether it is an even number or an odd number, according to the area of the deployable antenna when the deployable antenna is deployed, and the material, strength, and the like of the rib to be used. Also, while the ribs 140 are arranged at a predetermined interval in the present embodiment, the interval may be a constant interval for all the ribs 140, may be a partly close interval, or may be a non-regular interval.

The sheet 150 that forms the reflector 121 in cooperation with the ribs 140 is installed across one pair of ribs 140 adjacent to each other. The sheet 150 is formed of a material capable of reflecting radio waves, and is formed in a parabolic shape as a whole. For example, the sheet 150 is formed of a metal mesh formed of molybdenum, gold, or a combination thereof. In the present embodiment, as the sheet 150, substantially triangular metal meshes are prepared according to the number of the ribs 140, the metal meshes are sewn together, and the sheet 150 is installed across the parabolic upper surfaces 141a of the ribs 140.

Here, in the present embodiment, the sheet 150 does not have much tension in a direction headed toward the central axis X of the hub 130, but has a certain tension in a direction perpendicular to this direction. Accordingly, when the ribs 140 are deployed and the reflector 121 is completely open, the tension causes the adjacent ribs 140 to pull each other, so that the interval between the adjacent ribs 140 can be maintained.

Additionally in the present embodiment, one sheet 150 is installed across one pair of ribs 140 adjacent to each other. However, one sheet 150 does not necessarily need to be installed across one pair of ribs 140, and may be installed across three or more continuous ribs 140. Also, a predetermined fold may be formed on the sheet 150 in order to further ensure the reproducibility of the folded shape. Further, while the sheet 150 has a parabolic shape at a mounting portion to the rib 140, that is, at or near each of sides 150a and 150b, it is preferable that the sheet 150 have a parabolic shape or a shape close to the parabolic shape in other positions. In such a case, it is possible to maintain a certain tension or more on the sheet 150 when the deployable antenna is opened.

The cases 160 are arranged along the outer periphery of the hub 130 so as to be openable and closable at predetermined intervals. The case 160 is formed in a tile shape having a circular horizontal cross-section so as to follow the outer peripheral surface shape of the hub 130 when closed. Then, when the case 160 is closed, a space having a predetermined width is formed between the outer periphery of the hub 130 and the case 160, and the ribs 140 folded so as to be wound around the hub 130 are accommodated in the space.

Each case 160 is disposed on the hub 130 with an opening mechanism 161. The opening mechanism 161 mechanically opens and closes the case 160 in response to a deployment instruction or a closing instruction from the processor 320 of the control unit 300. For example, a motor is used through a worm gear as the opening mechanism.

Additionally, the case 160 is used to restrict the deployable antenna from deploying by the elastic force of the ribs 140 when the deployable antenna is folded, that is, when the ribs 140 are stored. Accordingly, in the present embodiment, any number of cases 160 may be arranged, as long as the deployment of the ribs 140 can be restricted. Also, while the case 160 is formed in a tile shape so as to follow the outer peripheral surface shape of the hub 130, the case 160 may be formed in any shape, as long as the above restriction can be made.

3. Structure of Rib 140

Figure 4A:
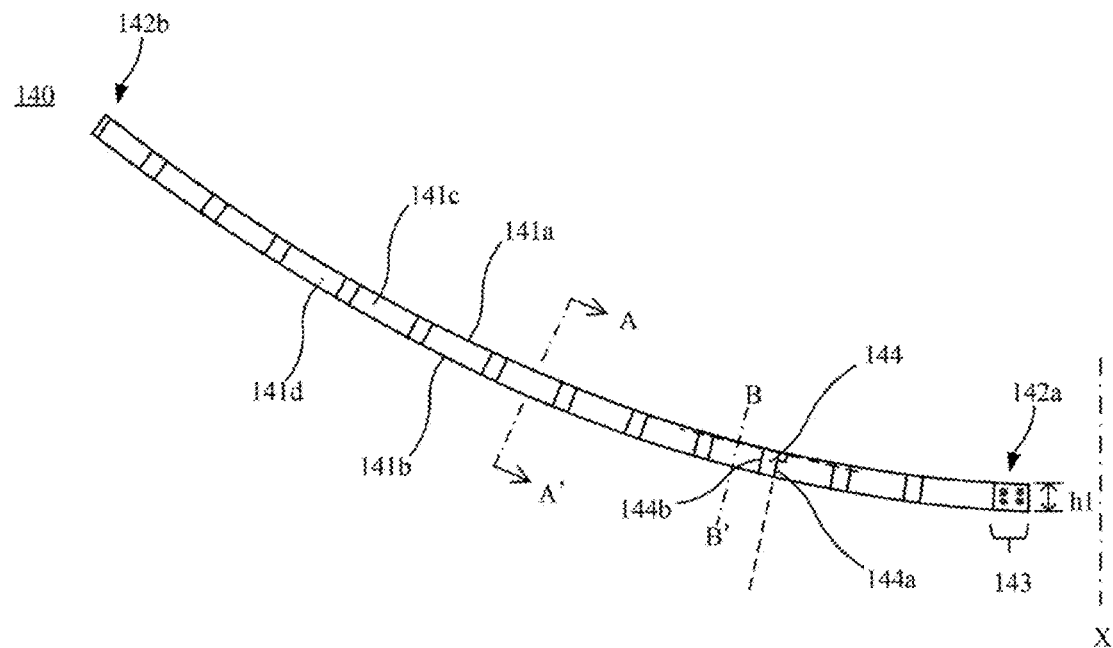
FIG. 4a is a side view showing the structure of a rib 140 according to the first embodiment of the present disclosure.

FIG. 4a is a side view showing the structure of the rib 140 according to the first embodiment of the present disclosure. Specifically, FIG. 4a shows a side view of the rib 140 shown in FIG. 3. According to FIG. 4a, the rib 140 has a horizontally long thin flat plate shape including the upper surface 141a on the side which is a reflecting mirror surface of the radio waves; a lower surface 141b that is a surface opposite to the upper surface 141a; an inner side surface 141c that connects the upper surface 141a and the lower surface 141b and faces the outer peripheral side of the hub 130 when the rib 140 is folded so as to be wound around the hub 130; and an outer side surface 141d that is a surface opposite to the inner side surface 141c. The upper surface 141a of the rib 140 is formed in a parabolic shape from a bottom end 142a connected to the hub 130 toward a tip end 142b on the opposite side. The rib 140 is configured of a spring material formed of a composite material such as stainless spring steel, glass fiber reinforced plastics (GFRPs), and carbon fiber reinforced plastics (CFRPs). Also, mounting holes 143 (four in FIG. 4a) penetrating in the thickness direction are formed in the bottom end 142a of the rib 140 to fix the rib 140 to the hub 130.

In the present embodiment, the rib 140 has restricting members 144 at predetermined intervals. The restricting member 144 is a member that has a certain thickness, high strength, and high rigidity, and particularly has rigidity against load from a direction in which the rib 140 is folded, that is, a direction perpendicular to the central axis of the hub 130. For example, the restricting member 144 has a honeycomb structure for ensuring the aforementioned rigidity, and is preferably formed in a rectangular parallelepiped. Additionally, the shape of the restricting member 144 is not limited to a rectangular parallelepiped, and may be any shape. The restricting members 144 are fixed to the inner side surface 141c or the outer side surface 141d of the rib 140 at predetermined intervals from the bottom end 142a to the tip end 142b of the rib 140 by a known method such as an adhesive or welding. At this time, each restricting member 144 is fixed in a direction perpendicular or substantially perpendicular to the upper surface 141a of the rib 140 at the position to be fixed.

Additionally, while the restricting member 144 is fixed to either the inner side surface 141c or the outer side surface 141d in the present embodiment, the restricting member 144 may be fixed to both surfaces. Also, the arrangement interval may be such that the arrangement interval is narrower toward the tip end 142b, wider toward the tip end 142b, or constant.

The restricting member 144 is a member for restricting the direction in which the rib 140 bends when the rib 140 is folded so as to be wound around the outer periphery of the hub 130. That is, in the present embodiment, each restricting member 144 is formed in a rectangular parallelepiped, and has side surfaces 144a and 144b that are arranged perpendicularly or substantially perpendicularly to the upper surface 141a and/or the lower surface 141b of the rib 140 at the position where the restricting member 144 is arranged.

Figure 4B:
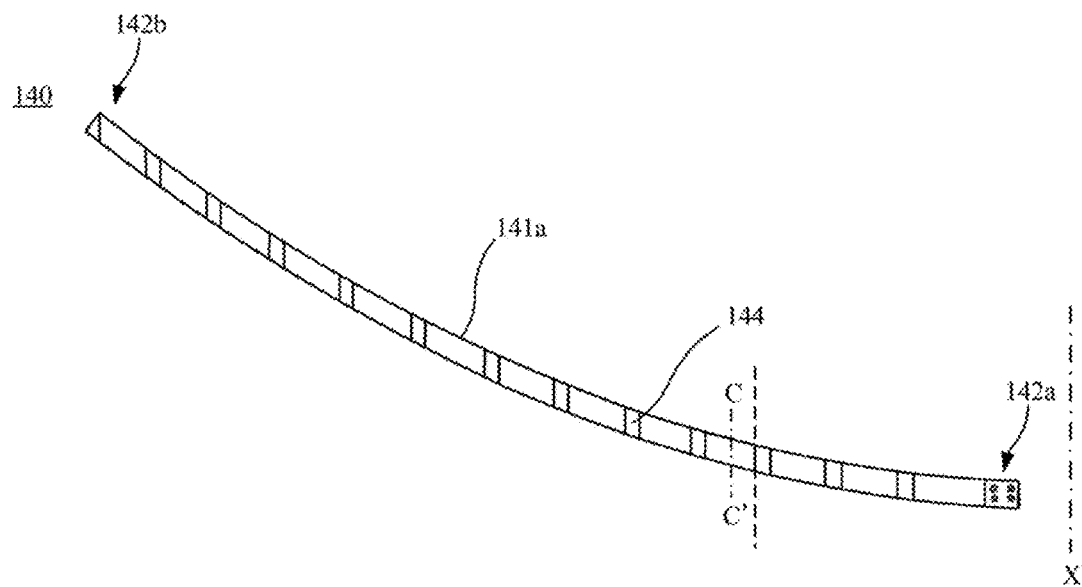
FIG. 4b is a diagram for describing the structure of the rib 140 according to the first embodiment of the present disclosure.

FIG. 4b is a diagram for describing the structure of the rib 140 according to the first embodiment of the present disclosure. Specifically, FIG. 4b is a diagram for describing the function of the restricting member 144 arranged on the rib 140. As described above, the rib 140 in FIG. 4a has the restricting member 144 arranged perpendicularly or substantially perpendicularly to the upper surface 141a and/or the lower surface 141b. However, the rib 140 of FIG. 4b has a restricting member 144 arranged in a direction parallel to the central axis X of the hub 130, instead of in a direction perpendicular or substantially perpendicular to the upper surface 141a and/or the lower surface 141b. Accordingly, when the rib 140 is folded so as to be wound around the hub 130, a region sandwiched by the restricting members 144 is easily bent along the side surface 144a arranged parallel to the central axis X of the hub 130 (direction along line C-C'), that is, in a direction parallel to the central axis X. As a result, as shown in FIG. 6c, the rib 140 is wound around the hub 130 in a spiral manner (curved so as to ascend in a direction having a component perpendicular to the surface of revolution formed by the rib 140), that is, so as to gradually ascend from the bottom end 142a toward the tip end 142b of the rib 140. Hence, the hub 130 requires a certain height or more.

On the other hand, returning to FIG. 4a, the present embodiment includes a restricting member 144 arranged perpendicularly or substantially perpendicularly to the upper surface 141a and/or the lower surface 141b. Accordingly, unlike the rib 140 shown in FIG. 4b, when the rib 140 is folded so as to be wound around the hub 130, a region sandwiched by the restricting members 144 is easily bent in a direction perpendicular or substantially perpendicular to the upper surface 141a and/or the lower surface 141b (direction along line B-B'). That is, the bending in the direction parallel to the central axis X is restricted by each of the restricting members 144, and the rib 140 hardly bends in the direction parallel to the central axis X. As a result, as shown in FIG. 6b, the rib 140 is folded along the outer periphery of the hub 130 so that the tip end 142b of the rib 140 is located at the same or substantially the same height as the bottom end 142a, that is, in an eddy shape. Hence, the height of the hub 130 can be reduced to about the same as a height h1 of the bottom end 142a of the rib 140.

Figure 4C:
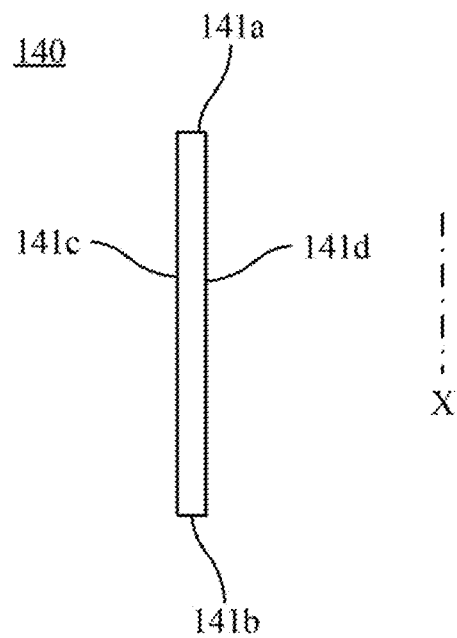
FIG. 4c is a cross-sectional view showing the structure of the rib 140 according to the first embodiment of the present disclosure.

FIG. 4c is a cross-sectional view showing the structure of the rib 140 according to the first embodiment of the present disclosure. Specifically, FIG. 4c is a diagram showing a cross section of the rib 140 along line A-A' shown in FIG. 4a. Referring to FIG. 4c, the rib 140 has a rectangular cross section configured of the upper surface 141a and the lower surface 141b extending in a direction perpendicular to the central axis X of the hub 130, and the inner side surface 141c and the outer side surface 141d connecting the upper surface 141a and the lower surface 141b. The inner side surface 141c is a surface facing the outer peripheral side of the hub 130 when the rib 140 is folded so as to be wound around the hub 130, and the outer side surface 141d is a surface facing the same direction as the outer peripheral side of the hub 130. Additionally, in the present embodiment, the rib 140 is formed to be thin in the thickness direction from the inner side surface 141c to the outer side surface 141d, and to be thick in the height direction from the upper surface 141a to the lower surface 141b. The rib 140 is manufactured from various spring materials having elasticity. With the structure described above, the rib 140 can have a certain rigidity against a load from above parallel to the axis X, and have sufficient flexibility against a load from a direction perpendicular to the axis X.

Figure 4D:
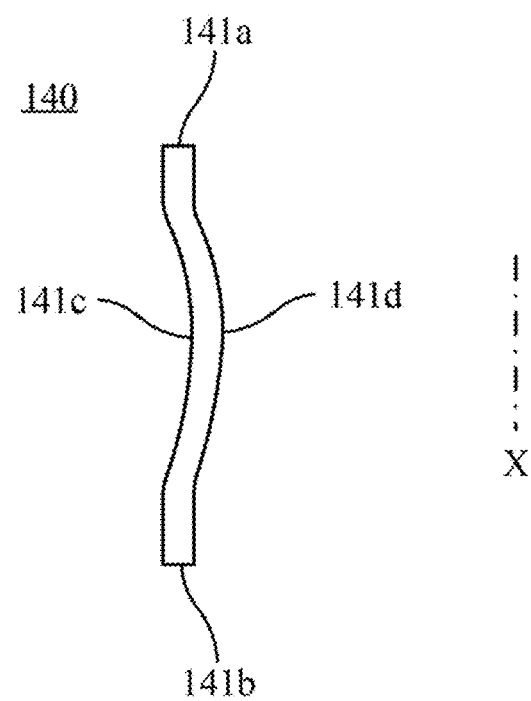
FIG. 4d is a cross-sectional view showing the other structure of the rib 140 according to the first embodiment of the present disclosure.

FIG. 4d is a cross-sectional view showing another structure of the rib 140 according to the first embodiment of the present disclosure. Specifically, FIG. 4d is a diagram showing another example of the cross section of the rib 140 along line A-A' shown in FIG. 4a. Referring to FIG. 4d, as in the example of FIG. 4c, the rib 140 has the upper surface 141a and the lower surface 141b, and the inner side surface 141c and the outer side surface 141d. Moreover, the rib 140 has a shape curved in a direction perpendicular to the axis X, that is, a shape curved in the width direction like a convex tape. More specifically, the rib 140 has a cross-sectional shape that is depressed on the inner side surface 141c side and protrudes on the outer side surface 141d side. By having such a shape, the transition of the rib 140 from the folded state to the fully extended state and the transition from the fully extended state to the folded state are facilitated. On the other hand, it is possible to prevent the rib 140 from being bent in a direction opposite to the direction in which the rib 140 is folded from a completely extended state.

4. Structure of Hub 130

Figure 5A:
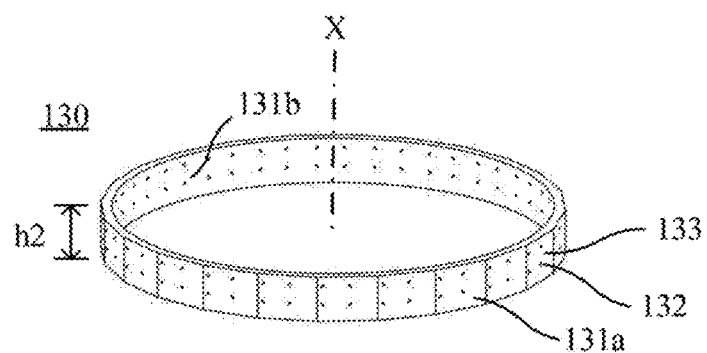
FIG. 5a is a perspective view showing the structure of a hub 130 according to the first embodiment of the present disclosure.
Figure 5B:
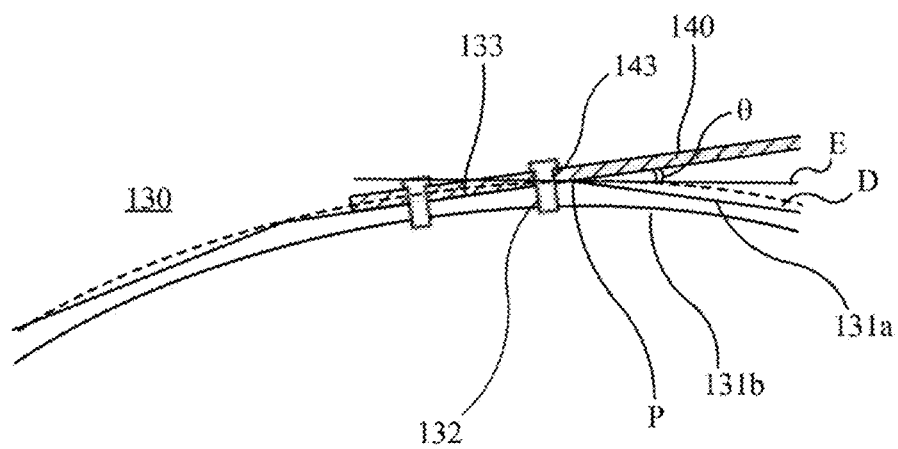
FIG. 5b is an enlarged view showing the structure of the hub 130 according to the first embodiment of the present disclosure from above.

FIG. 5a is a perspective view showing the structure of the hub 130 according to the first embodiment of the present disclosure. Additionally, FIG. 5b is an enlarged view showing the structure of the hub 130 according to the first embodiment of the present disclosure from above. Referring to FIGS. 5a and 5b, the hub 130 has a substantially circular cross section as a whole. Additionally, the cross-sectional shape is not limited to a circular shape, but may be an elliptical shape or a polygonal shape.

The hub 130 has an inner peripheral surface 131b formed in a columnar shape, and the outer peripheral surface 131a formed in a polygonal column (24-prism, for example) shape. The outer peripheral surface 131a has the planar rib mounting portions 133 according to the number of the ribs 140 to be mounted. Each rib mounting portion 133 has rib mounting holes 132 in positions corresponding to the mounting holes 143 of the rib 140 to be mounted. Then, the mounting hole 143 of the rib 140 and the rib mounting hole 132 of the hub 130 are fixed to each other by a known method such as a screw.

In the present embodiment, the hub 130 has a height h2 in a direction along the central axis of the hub 130. As described above, the rib 140 of the present embodiment is folded by the effect of the restricting members 144 in an eddy shape. Accordingly, the height h2 is formed to be equal to or substantially equal to the height h1 at the bottom end 142a of the rib 140.

In the present embodiment, 24 ribs 140 are used. Accordingly, the hub 130 includes 24 rib mounting portions 133 along the outer periphery thereof, and the outer periphery of the hub 130 is formed in the shape of a 24-sided polygon as a whole. Also, each rib 140 is arranged such that its bottom end 142a extends along the plane of the rib mounting portion 133. Accordingly, each rib 140 is not mounted along a tangent E at a point P (an end of the rib mounting portion 133 in the direction in which the rib 140 extends) of an imaginary circumcircle D of the hub 130, but the rib 140 is mounted in a direction in which the rib 140 is deployed by an angle θ (15 degrees, for example) from the tangent E, that is, mounted so as to be tilted in a direction opposite to the central axis X of the hub 130.

5. Mounting Structure of Rib 140 to Hub 130 and Folding Structure

Figure 6A:
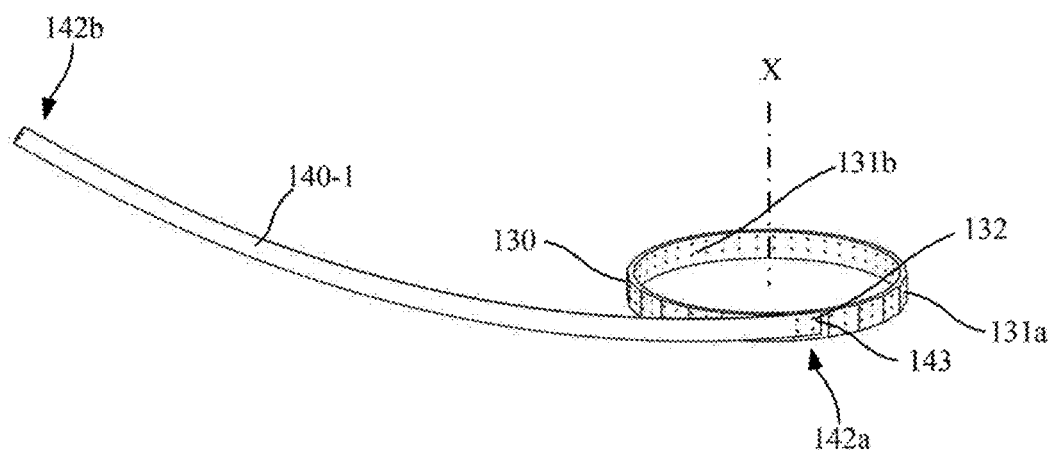
FIG. 6a is a diagram showing a mounting structure of the rib 140 and the hub 130 according to the first embodiment of the present disclosure.
Figure 6B:
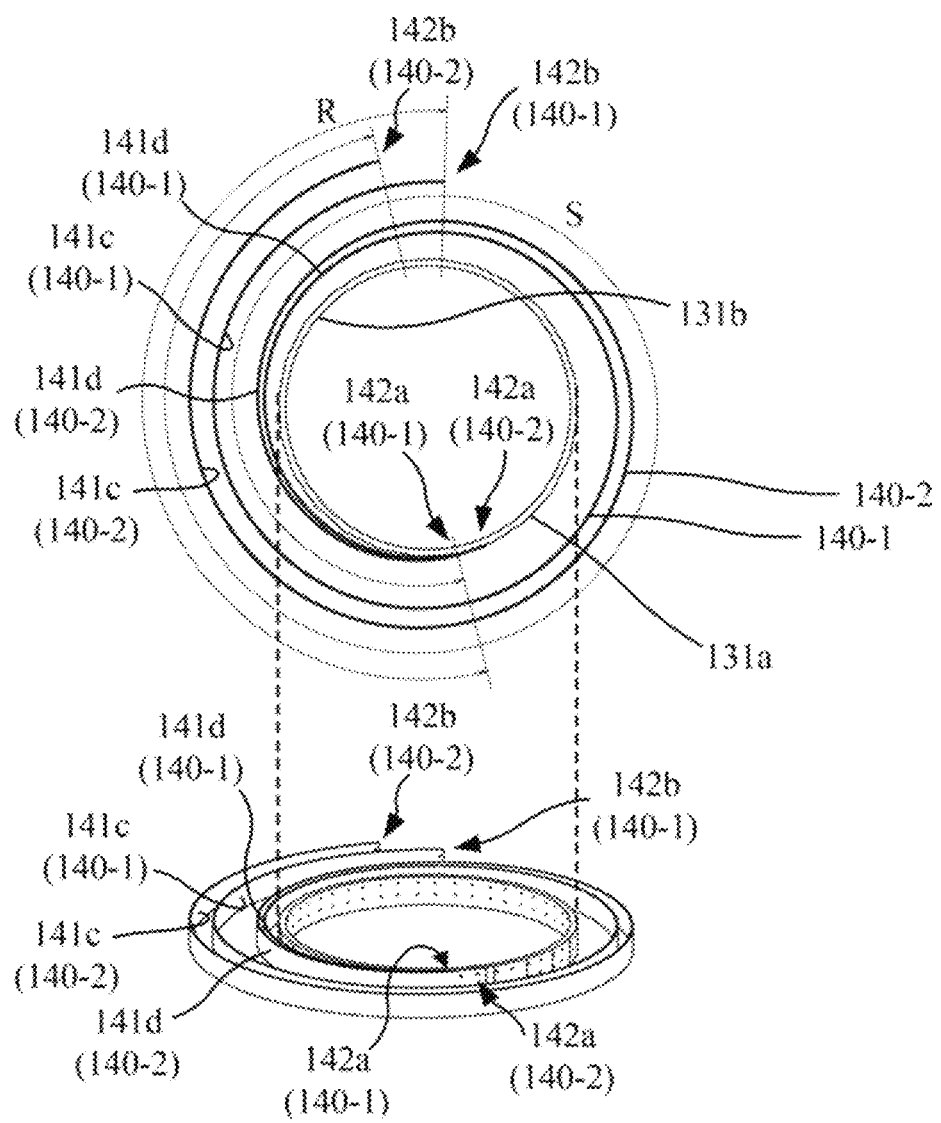
FIG. 6b is a diagram showing a folding structure of the rib 140 and the hub 130 according to the first embodiment of the present disclosure.
Figure 6C:
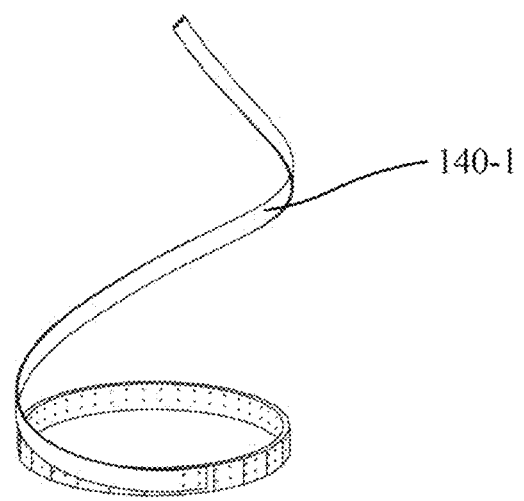
FIG. 6c is a diagram for describing the folding structure of the rib 140 and the hub 130 according to the first embodiment of the present disclosure.

FIG. 6a is a diagram showing a mounting structure of the rib 140 to the hub 130 according to the first embodiment of the present disclosure. Additionally, while FIG. 6a shows the mounting structure of one rib 140-1 of the multiple ribs 140 and the hub 130 for convenience of description, the other ribs 140-2 to 140-n are also mounted to the hub 130 with a similar mounting structure.

Multiple rib mounting holes 132 (for example, one rib mounting hole 132 has four holes) are formed on the outer peripheral surface 131a of the hub 130 at predetermined intervals. The position of the rib mounting hole 132 corresponds to the position of the mounting hole 143 of the bottom end 142*a* of the rib 140, and the rib 140 and the outer peripheral surface 131*a* of the hub 130 are fixed from the outside of the rib 140 by unillustrated bolts or the like. In the present embodiment, each rib mounting hole 132 is provided in the planar rib mounting portion 133 on the outer peripheral surface 131*a*. Then, the inner side surface 141*c* of the rib 140 on the bottom end 142*a* side is fixed along the plane of the rib mounting portion 133.

In the present embodiment, the rib 140 is fixed along the outer periphery of the hub 130, specifically, along the planar rib mounting portion 133. However, the rib 140 may be fixed along the outer periphery of the hub 130, specifically, along the tangent E (FIG. 5*b*) of the circumcircle of the outer peripheral surface 131*a* of the hub 130. That is, unless the rib 140 is fixed along a direction perpendicular to the central axis of the hub 130, the mounting angle to the outer peripheral surface 131*a* of the hub 130 can be appropriately designed. Moreover, even though it may be necessary to reinforce the hinge mechanism and the bottom end 142*a* of the rib 140 (none is shown), the rib 140 can be mounted in a direction perpendicular to the central axis of the hub 130.

FIG. 6*b* is a diagram showing a folding structure of the rib 140 and the hub 130 according to the first embodiment of the present disclosure. Additionally, while FIG. 6*b* shows the folding structure of ribs 140-1 and 140-2 of the multiple ribs 140 for convenience of description, the same applies to other ribs 140-3 to 140-*n*.

In the present embodiment, the ribs 140-1 and 140-2 are folded so as to be reeled in from the bottom end 142*a* toward the tip end 142*b* along the outer periphery of the hub 130. Here, each of the ribs 140-1 and 140-2 is fixed along the outer periphery of the hub 130 (FIG. 6*a*). Hence, no large stress due to folding occurs in the bottom end 142*a* of the rib 140, and the rib 140 can be stably stored.

As described in FIGS. 4*a* and 4*b*, the rib 140 is folded such that the tip end 142*b* is positioned by the restricting member 144 to be at the same height or substantially the same height as the bottom end 142*a* of the ribs 140-1 and 140-2, that is, in an eddy shape (wound in a state where there is no component or almost no component in the direction perpendicular to the surface of revolution formed by the rib 140). Hence, focusing only on a single rib (rib 140-1), as shown in FIG. 6*b*, when the rib 140-1 is folded so as to be wound around the hub 130, the outer side surface 141*d* and the inner side surface 141*c* of the rib 140-1 partially face each other in a section R. Similarly, focusing only on a single rib (rib 140-2), as shown in FIG. 6*b*, when the rib 140-2 is folded so as to be wound around the hub 130, the outer side surface 141*d* and the inner side surface 141*c* of the rib 140-2 partially face each other. Additionally, while the outer side surface 141*d* and the inner side surface 141*c* do not face each other in parts other than the section R in the present embodiment, the rib 140-1 is wound around the outer periphery of the hub 130 multiple times depending on the length of the rib 140-1. Accordingly, the length of the section that the outer side surface and the inner side surface face each other may be the entire outer periphery. Additionally, on the other hand, when the length of the rib 140 is shorter than the outer periphery of the hub 130, the above-mentioned partial facing may not be formed in some cases.

Also, the ribs 140-1 and 140-2 are each folded in an eddy shape. Hence, focusing on the rib 140-1 and the rib 140-2 adjacent thereto, in a section (section S) from the position of the bottom end 142*a* of the rib 140-1 to the position of the tip end 140*b* of the rib 140-2, the ribs 140-1 and 140-2 are wound around the hub 130 while facing each other. Accordingly, in the section S, the outer side surface 141*d* of the rib 140-1 and the inner side surface 141*c* of the rib 140-2, and the outer side surface 141*d* of the rib 140-2 and the inner side surface 141*c* of the rib 140-1 are wound so as to partially face each other.

FIG. 6*c* is a diagram for describing a folding structure of the rib 140 and the hub 130 according to the first embodiment of the present disclosure. Specifically, FIG. 6*c* is a diagram showing a structure when the rib 140 shown in FIG. 4*b* is folded so as to be wound around the hub 130. In this case, the rib 140 is spirally wound around the hub 130, that is, wound so as to gradually ascend from the bottom end 142*a* to the tip end 142*b* of the rib 140. Accordingly, as shown in FIG. 6*c*, the rib 140 is wound without the outer side surface 141*d* and the inner side surface 141*c* of the rib 140 facing each other.

6. Folding and Deployment of Rib 140

Figure 7:
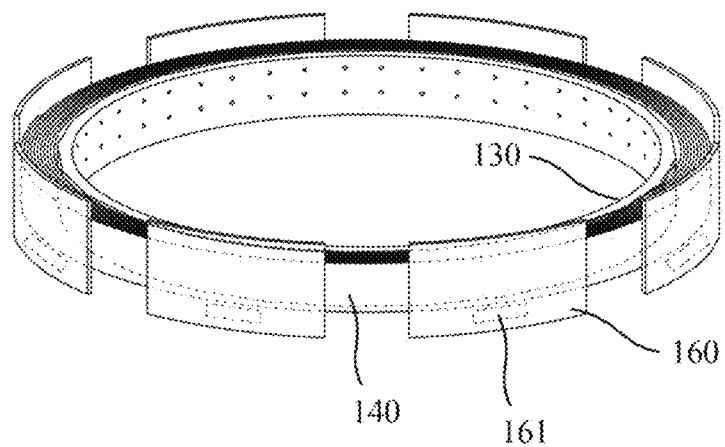
FIG. 7 is a diagram for describing folding of the rib 140 according to the first embodiment of the present disclosure.

FIG. 7 is a diagram for describing the folding of the rib 140 according to the first embodiment of the present disclosure. Also, FIG. 8 is a diagram for describing deployment of the rib 140 according to the first embodiment of the present disclosure.

According to FIG. 7, each rib 140 is wound around the hub 130, and multiple cases 160 are arranged around the hub 130 so as to surround the wound rib 140 from outside. Each case 160 has a tile shape with an arc-shaped horizontal cross section, and the multiple cases 160 are arranged so as to form a cylindrical shape as a whole. That is, at the time of storage, each of the multiple ribs 140 is warped in the outer peripheral direction of the hub 130, and is wound around the hub 130 from the bottom end 142*a* toward the tip end 142*b*. Thereafter, the ribs 140 are restrained from the outside by the multiple cases 160. Although the rib 140 has elasticity in the deploying direction, the rib 140 is restricted from deploying by its own elasticity by the external restraint by the case 160.

Figure 8:
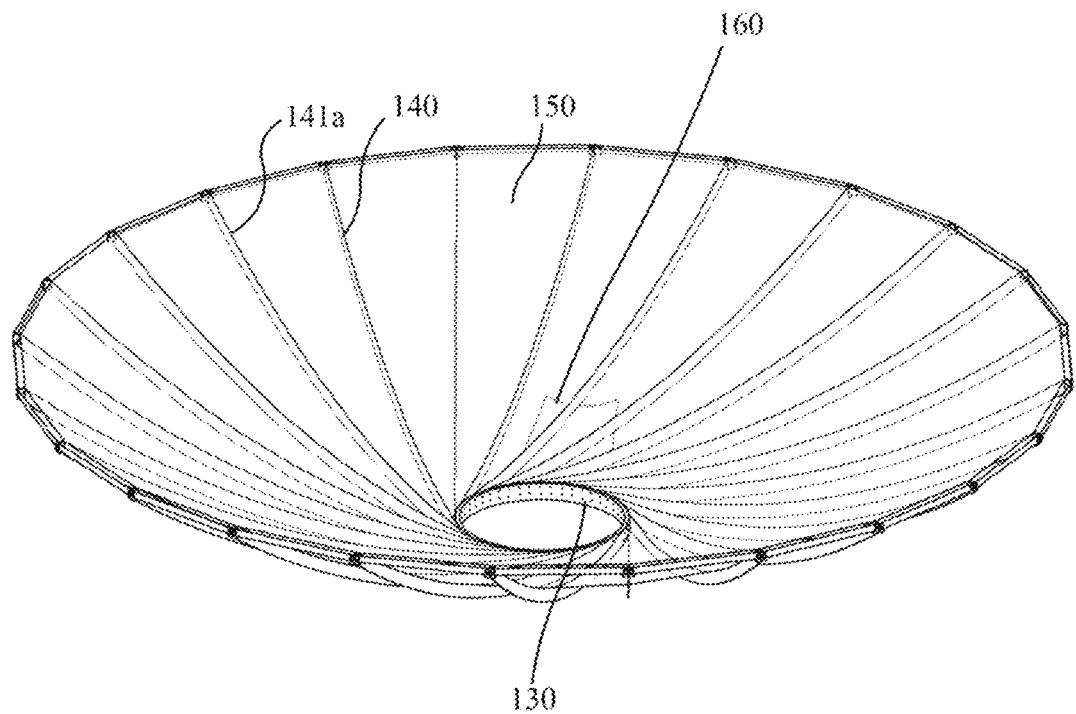
FIG. 8 is a diagram for describing deployment of the rib 140 according to the first embodiment of the present disclosure.

FIG. 8 shows a state in which each case 160 is opened so as to separate from the hub 130 around an opening mechanism 161 provided on the lower edge of the case 160. The case 160 is opened mechanically by the opening mechanism 161 provided below each case 160. As the opening mechanism 161, a mechanism that opens the case 160 by a motor through a worm gear is used, for example.

When each case 160 is opened, the external restraint on each rib 140 by each case 160 is released, and the rib 140 starts to automatically deploy by the elastic restoring force of the rib 140 itself. When the rewinding of each rib 140 by the elastic restoring force is completed, the parabolic shape of the reflector 121 as shown in FIG. 8 is formed. That is, at the time of deployment, by releasing the external restraint by the multiple cases 160 on the ribs 140, the rib 140 is automatically deployed by the elastic restoring force of the rib 140 itself with no application of load by other members.

Additionally, at the time of deployment, it is assumed that the rib 140 is deployed with a certain error in the out-of-plane direction. However, the in-plane shape of the rib 140 shows the exact original parabolic shape. The mirror accuracy of the deployable antenna 10 is evaluated on the basis of the error in the X-axis direction, that is, the position error of the rib 140 in the in-plane direction, and the position error of the rib 140 in the out-of-plane direction has no significant effect. Hence, the mirror accuracy of the antenna 10 after the deployment can be ensured.

As described above, according to the reflector 121 of the present embodiment, the folding and deployment of each rib 140 are realized by the elastic deformation and restoring force of each rib 140. That is, there is no need for a special mechanism for folding and deploying the rib 140. Hence, according to the present embodiment, it is possible to achieve easy deployment in space with a simple configuration, and to obtain a desired parabolic shape after deployment. Also, each rib 140 is provided along the outer periphery of the hub 130. Accordingly, it is possible to minimize the stress applied to the bottom end 142a of the rib 140 when each rib 140 is stored. Moreover, since each rib 140 includes the restricting member 144, at the time of folding, the rib 140 is restricted from being folded in a spiral shape. Accordingly, the hub 130 around which the rib 140 is wound can be formed with a minimum height.

Second Embodiment

In the first embodiment, a case where one flat elastic member is used for the rib 140 has been described. In a second embodiment, a case where multiple flat plates (two flat plates 140a and 140b in the present embodiment) are used as a rib 140 will be described. Additionally, the present embodiment is similar to the structure in the first embodiment, except for the points that will be specifically described below. Hence, detailed description of the similar matters will be omitted.

Figure 9:
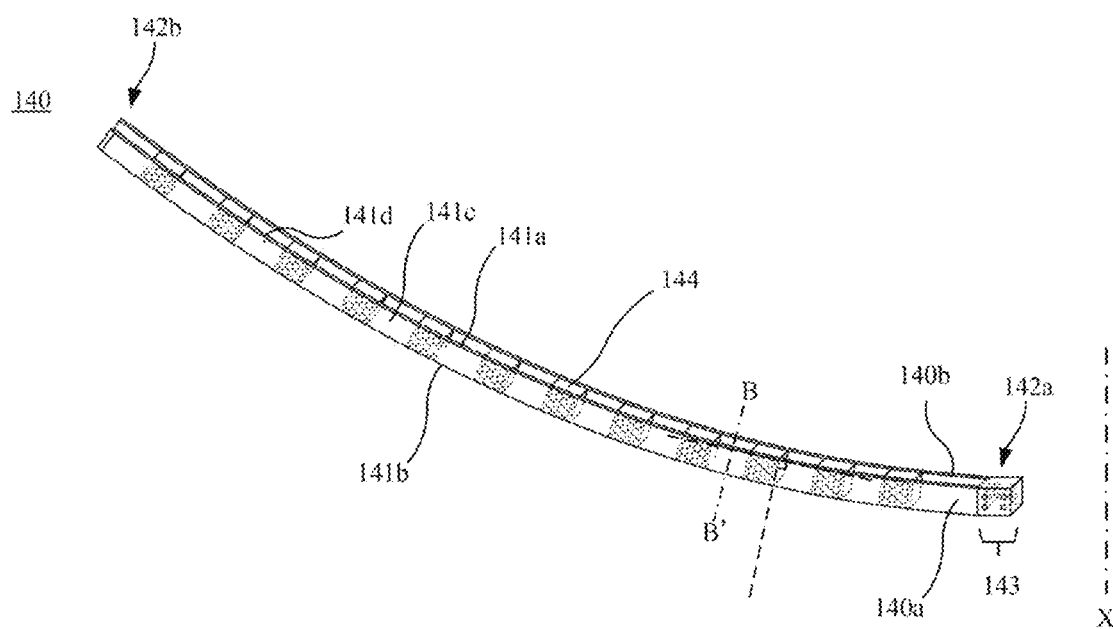
FIG. 9 is a diagram showing the structure of a rib 140 according to a second embodiment of the present disclosure.

FIG. 9 is a diagram showing the structure of the rib 140 according to the second embodiment of the present disclosure. Specifically, FIG. 9 shows a perspective view of the rib 140 according to the second embodiment. According to FIG. 9, the rib 140 is includes a pair of flat plates 140a and 140b, and the flat plates 140a and 140b are fixed so as to face each other. At this time, the flat plates 140a and 140b are bonded through a restricting member 144 interposed therebetween. The rib 140 is provided with mounting holes 143 at its bottom end 142a for fixing to a hub 130. Also, in a state where the flat plates 140a and 140b face each other, the rib 140, as a whole, has an upper surface 141a, a lower surface 141b, an inner side surface 141c, and an outer side surface 141d as similar to the first embodiment. The rib 140 is fixed to the hub 130 along the outer periphery of the hub 130, but has flexibility in a direction headed toward the outer periphery of the hub 130. On the other hand, when the rib 140 is wound around the hub 130, it has elasticity in the deploying direction.

Here, the restricting member 144 that bonds the flat plates 140a and 140b acts to restrict the bending direction of the rib 140, as similar to the first embodiment. That is, as described with reference to FIGS. 4a and 4b, each of the restricting members 144 facilitates bending at a part between the restricting members, but restricts bending in a direction parallel to the central axis X. On the other hand, the restricting member 144 facilitates bending of the rib 140 in a direction perpendicular or substantially perpendicular to the upper surface 141a and/or the lower surface 141b (direction along line B-B'). That is, as similar to the first embodiment, when the rib 140 is wound around the hub 130, the inner side surface 141c and the outer side surface 141d partially face each other in the wound state, so that the height of the rib 140 can be reduced.

Additionally, while the rib 140 includes two flat plates 140a and 140b in the present embodiment, it is also possible to add one or more flat plates so that each flat plate faces its adjacent flat plate. Also, in this case, the restricting member 144 does not need to be installed between all the flat plates, and may be arranged only between some of the plates, such as in the order of flat plate, flat plate, restricting member, flat plate, from the inner side surface 141c side to the outer side surface 141d side.

As described above, according to a reflector 121 according to the second embodiment, the folding and deployment of each rib 140 are realized by the elastic deformation and restoring force of each rib 140. That is, there is no need for a special mechanism for folding and deploying the rib 140. Hence, according to the present embodiment, it is possible to achieve easy deployment in space with a simple configuration, and to obtain a desired parabolic shape after deployment. Also, each rib 140 is provided along the outer periphery of the hub 130. Accordingly, it is possible to minimize the stress applied to the bottom end 142a of the rib 140 when each rib 140 is stored. Moreover, since each rib 140 includes the restricting member 144, at the time of folding, the rib 140 is restricted from being folded in a spiral shape. Accordingly, the hub 130 around which the rib 140 is wound can be formed with a minimum height. Moreover, since the rib 140 includes two flat plates 140a and 140b, the rigidity of the rib 140 can be further increased.

Third Embodiment

In the first and second embodiments, the ribs 140 are deployed by the elasticity of the ribs 140, and even after the deployment, the interval between the adjacent ribs 140 is maintained by the tension of the sheet 150. However, due to the influence of the tension, the interval between the adjacent ribs 140 may become smaller than the originally desired interval, which may cause a half-open state of the rib 140. Against this background, in a third embodiment, a reinforcing rib 145 is provided between adjacent ribs 140. Additionally, the present embodiment is similar to the configuration in the first and second embodiments, except for the points that will be specifically described below. Hence, detailed description of the similar matters will be omitted.

Figure 10A:
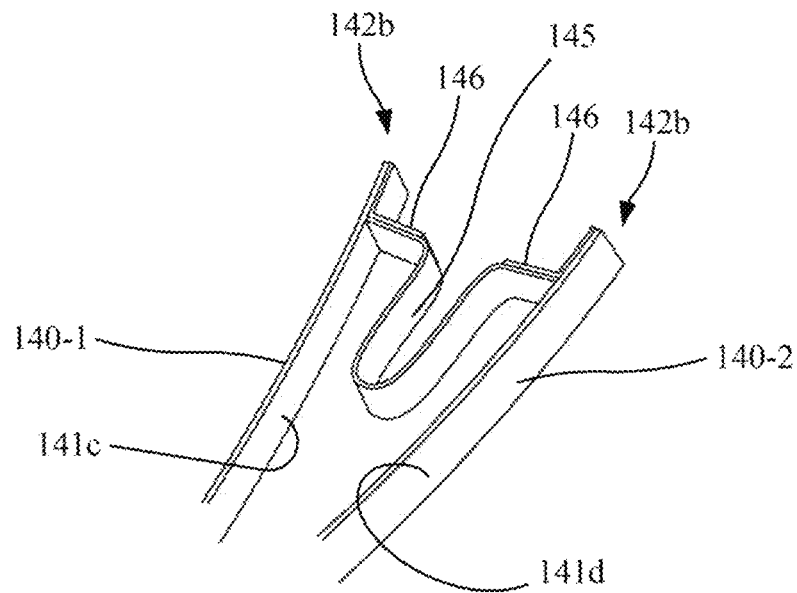
FIG. 10a is a diagram showing the structure of a rib 140 according to a third embodiment of the present disclosure.
Figure 10B:
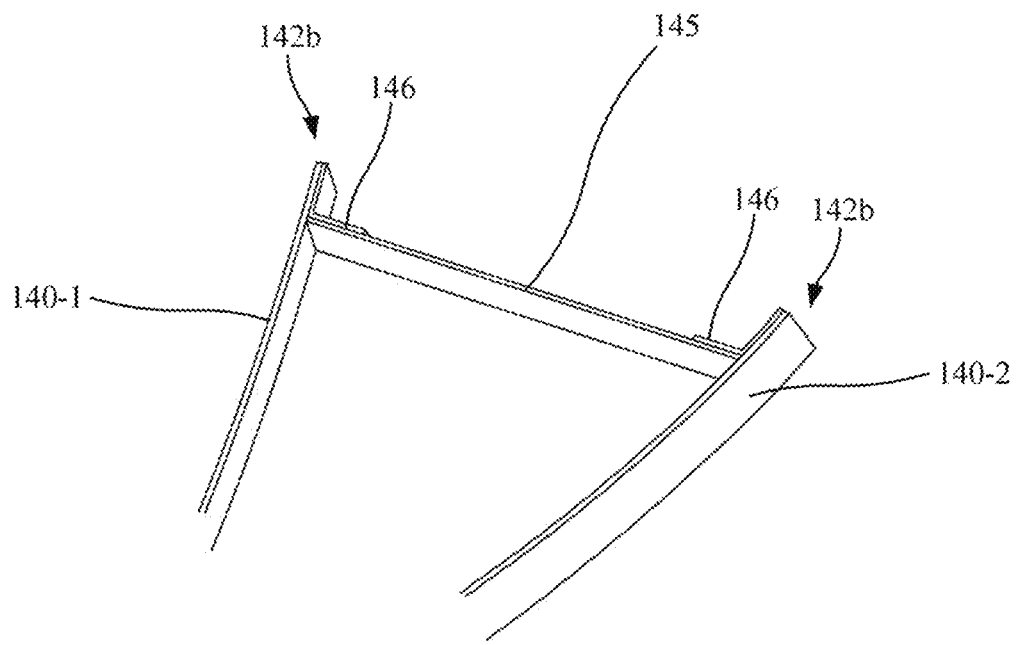
FIG. 10b is a diagram showing the structure of the rib 140 according to the third embodiment of the present disclosure.

FIGS. 10a and 10b are diagrams showing the structure of the rib 140 according to the third embodiment of the present disclosure. Specifically, FIG. 10a is a diagram showing a state where each rib 140 of a reflector 121 is in the course of deployment. Also, FIG. 10b is a diagram showing a state in which each rib 140 of the reflector 121 is completely deployed.

According to FIG. 10a, L-shaped flanges 146 are disposed so as to face each other between an outer side surface 141d of a tip end 142b of a rib 140-1 and an inner side surface 141c of a tip end 142b of an adjacent rib 140-2. Then, both ends of the reinforcing rib 145 are fixed on the back surface of the L-shaped flanges 146, so that the reinforcing rib 145 is arranged between the ribs 140-1 and 140-2.

The reinforcing rib 145 is a horizontally long flat plate made of a spring material. For example, the reinforcing rib 145 has a shape curved in the width direction like a convex tape. Additionally, the reinforcing ribs 145 can also be used in a curved form to face each other in the longitudinal direction.

When the reflector 121 is folded, as shown in FIG. 10a, the reinforcing rib 145 is warped in the direction of the central axis X of the hub 130, and is stored in a state where the distance between the tip ends of the adjacent ribs 140 is short. On the other hand, at the time of deployment, as shown in FIG. 10b, the distance between the adjacent ribs 140 can be forcibly maintained by the elastic restoring force of the reinforcing rib 145.

As described above, according to the reflector 121 according to the third embodiment, the folding and deployment of each rib 140 are realized by the elastic deformation and restoring force of each rib 140. That is, there is no need for a special mechanism for folding and deploying the rib 140. Hence, according to the present embodiment, it is possible to achieve easy deployment in space with a simple configuration, and to obtain a desired parabolic shape after deployment. Also, each rib 140 is provided along the outer periphery of the hub 130. Accordingly, it is possible to minimize the stress applied to the bottom end 142a of the rib 140 when each rib 140 is stored. Moreover, since each rib 140 includes the restricting member 144, at the time of folding, the rib 140 is restricted from being folded in a spiral shape. Accordingly, the hub 130 around which the rib 140 is wound can be formed with a minimum height. Moreover, since the reinforcing rib 145 is provided, it is possible to keep the interval between the adjacent ribs 140 constant.

Fourth Embodiment

In the first to third embodiments, the case has been described where the ribs 140 having substantially the same height are used in the bottom end 142a and the tip end 142b. In a fourth embodiment, a rib 140 whose height is gradually reduced from a bottom end 142a toward a tip end 142b is used. Additionally, the present embodiment is similar to the configuration in the first to third embodiments, except for the points that will be specifically described below. Hence, detailed description of the similar matters will be omitted.

Figure 11:
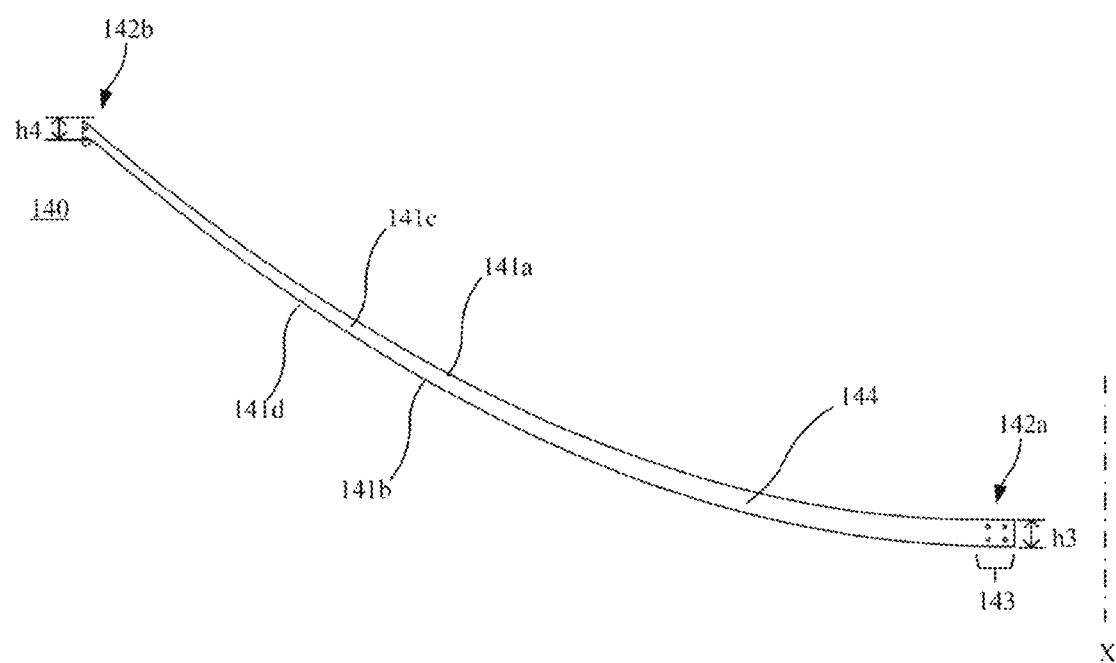
FIG. 11 is a side view showing the structure of a rib 140 according to a fourth embodiment of the present disclosure.

FIG. 11 is a side view showing the structure of the rib 140 according to the fourth embodiment of the present disclosure. Specifically, according to FIG. 11, as similar to the rib 140 shown in FIG. 4a, the rib 140 has a horizontally long thin flat plate shape including an upper surface 141a on the side which is a reflecting mirror surface of radio waves; a lower surface 141b that is a surface opposite to the upper surface 141a; an inner side surface 141c that connects the upper surface 141a and the lower surface 141b and faces the outer peripheral side of a hub 130 when the rib 140 is folded so as to be wound around the hub 130; and an outer side surface 141d that is a surface opposite to the inner side surface 141c. Also, in order to fold the rib 140 in an eddy shape around the hub 130, the rib 140 has a restricting member 144 as similar to the rib 140 shown in FIG. 4a.

Here, in a reflector 121, generally, a relatively larger load is applied to the bottom end 142a than to the tip end 142b. Accordingly, in the present embodiment, the height of the rib 140 in the direction along a central axis X of the hub 130 is formed high at the bottom end 142a where a large load is applied, and is gradually reduced toward the tip end 142b. Specifically, the rib 140 has a height h3 at the bottom end 142a, but has a height h4 lower than the height h3 at the tip end 142b. Additionally, in the example of FIG. 11, the reinforcing rib shown in FIGS. 10a and 10b is mounted to the tip end 142b. Accordingly, in order to attach the reinforcing rib, the tip end of the rib 140 is formed slightly higher (wider) than the height h4.

As described above, according to the reflector 121 according to the fourth embodiment, the folding and deployment of each rib 140 are realized by the elastic deformation and restoring force of each rib 140. That is, there is no need for a special mechanism for folding and deploying the rib 140. Hence, according to the present embodiment, it is possible to achieve easy deployment in space with a simple configuration, and to obtain a desired parabolic shape after deployment. Additionally, each rib 140 is provided along the outer periphery of the hub 130. Accordingly, it is possible to minimize the stress applied to the bottom end 142a of the rib 140 when each rib 140 is stored. Moreover, since each rib 140 includes the restricting member 144, at the time of folding, the rib 140 is restricted from being folded in a spiral shape. Accordingly, the hub 130 around which the rib 140 is wound can be formed with a minimum height.

<Others>

In the first to fourth embodiments, the so-called Cassegrain deployable antenna 10 having the subreflector 122 in addition to the reflector 121 has been described. However, the deployable antenna is not limited to the deployable antenna 10, and may be a Gregorian deployable antenna, or a parabolic deployable antenna that radiates radio waves from the front surface of the reflector 121.

Also, while the reflector 121 is used for the deployable antenna 10 and the spacecraft 1 including the deployable antenna 10, the reflector 121 or the deployable antenna 10 may be used for other purposes. For example, the reflector 121 can be installed on an airplane or an automobile and be used as a mobile communication device.

It is also possible to appropriately combine or replace the components described in the embodiments.

REFERENCE SIGNS LIST

1 Spacecraft
10 Deployable antenna
100 Communication unit
200 Power supply unit
300 Control unit

The invention claimed is:

1. A reflector, comprising:
a hub having a cross section formed in a circular, elliptical or polygonal shape;
a plurality of ribs, each of which has an inner side surface facing an outer peripheral side of the hub when folded, and an outer side surface that is a surface opposite to the inner side surface, the plurality of ribs being folded so as to be wound around an outer periphery of the hub such that the inner side surface of each rib and the outer side surface of its adjacent rib partially face each other or the outer side surface of each rib and the inner side surface of its adjacent rib partially face each other, each rib being deployed in a parabolic shape from a bottom end connected to the hub toward a tip end located opposite to the bottom end; and
a sheet installed across each of the plurality of ribs and capable of reflecting radio waves;
wherein each of the plurality of ribs is formed of at least two flat plates which face each other; and
wherein each of the plurality of ribs includes a plurality of restricting members disposed between the two flat plates at predetermined intervals between the bottom end and the tip end.

2. The reflector according to claim 1, wherein each of the plurality of ribs has elasticity, and is deployed by the elasticity from a folded state.

3. The reflector according to claim 1, wherein the plurality of restricting members of each rib are arranged on at least one of the inner side surface or the outer side surface at predetermined intervals between the bottom end and the tip end.

4. The reflector according to claim 3, wherein
each of the plurality of ribs has an upper surface across which the sheet is installed, and
each of the restricting members is disposed in a direction perpendicular or substantially perpendicular to the upper surface.

5. The reflector according to claim 1, wherein each of the plurality of ribs is connected to the hub at the bottom end along an outer periphery of the hub.

6. The reflector according to claim 1, wherein each of the plurality of ribs is formed such that a height in a direction along a central axis of the hub decreases from the bottom end of the rib toward the tip end of the rib.

7. The reflector according to claim 1, wherein each of the plurality of ribs is connected to the hub such that an inner side surface of the rib and an outer side surface of the rib are substantially parallel to a central axis of the hub.

8. The reflector according to claim 1, wherein the sheet is formed of a metal mesh.

9. The reflector according to claim 1, wherein each of the plurality of ribs is folded so as to be wound around an outer periphery of the hub such that the inner side surface of each rib and the outer side surface of each rib partially face each other.

10. A deployable antenna comprising:
the reflector according to claim 1; and
a radiator that emits radio waves to the sheet of the reflector.

11. A spacecraft, comprising:
the reflector according to claim 1;
a radiator that emits radio waves to the sheet of the reflector;
a control device that generates information for transmission by the radio waves; and
a power supply device that supplies electric power required to drive the radiator and the control device.

12. The reflector according to claim 1, wherein:
each of the plurality of ribs has an upper surface across which the sheet is installed and a lower surface;
each of the restricting members is disposed in a direction perpendicular or substantially perpendicular to the upper surface;
each rib of the plurality of ribs has one or more regions between adjacent restricting members of the plurality of restricting members; and
wherein each of the one or more regions is configured to bend in a direction perpendicular or substantially perpendicular to the upper surface and/or the lower surface when the rib is folded to be wound around the hub.

* * * * *